US012573895B2

(12) United States Patent
    Luo

(10) Patent No.: US 12,573,895 B2
(45) Date of Patent: Mar. 10, 2026

(54) ROTOR PUNCHING SHEET, MOTOR ROTOR, MOTOR AND VEHICLE

(71) Applicant: XIAOMI EV TECHNOLOGY CO., LTD., Beijing (CN)

(72) Inventor: Xuan Luo, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 288 days.

(21) Appl. No.: 18/373,734

(22) Filed: Sep. 27, 2023

(65) Prior Publication Data

US 2024/0356396 A1     Oct. 24, 2024

(30) Foreign Application Priority Data

Apr. 20, 2023    (CN) .......................... 202310431608.9

(51) Int. Cl.
    *H02K 1/276*          (2022.01)
(52) U.S. Cl.
    CPC .................................... *H02K 1/276* (2013.01)
(58) Field of Classification Search
    CPC ..... H02K 1/276; H02K 1/2766; H02K 1/2773
    See application file for complete search history.

(56) References Cited

U.S. PATENT DOCUMENTS

| | | | |
|---|---|---|---|
| 2020/0044501 A1* | 2/2020 | Matsubara | ............. H02K 29/03 |
| 2022/0014057 A1* | 1/2022 | Zou | ...................... H02K 1/2766 |

| | | | |
|---|---|---|---|
| 2022/0385124 A1* | 12/2022 | Mitsuda | ................. H02K 21/14 |
| 2023/0283130 A1* | 9/2023 | Zhang | ................... H02K 1/2766 |
| | | | 310/156.01 |
| 2023/0412018 A1* | 12/2023 | Saito | ...................... H02K 1/276 |

FOREIGN PATENT DOCUMENTS

| | | |
|---|---|---|
| CN | 111769668 A | 10/2020 |
| CN | 112953055 A | 6/2021 |
| CN | 217692848 U | 10/2022 |
| CN | 115864699 A | 3/2023 |
| CN | 115912839 A | 4/2023 |
| EP | 3611825 A1 | 2/2020 |

(Continued)

OTHER PUBLICATIONS

WO2021063014A1 (translation) (Year: 2021).*

(Continued)

*Primary Examiner* — Oluseye Iwarere
*Assistant Examiner* — Nicholas Lee Setzer
(74) *Attorney, Agent, or Firm* — Cozen O'Connor

(57)          ABSTRACT

A rotor punching sheet includes a sheet body and a plurality of magnet slots defined in the sheet body. Each magnet slot includes a first section and a second section arranged opposite to each other and each configured to extend in a first direction; and a third section and a fourth section arranged opposite to each other and each adjacent to and connected to the first section and the second section, to form the magnet slot together with the first section and the second section. The first section and the third section are connected to each other through a curved section, the curved section is configured to arch towards a side away from a center of the sheet body in a second direction relative to the first section, and the second direction is perpendicular to the first direction.

15 Claims, 5 Drawing Sheets

(56)        References Cited

FOREIGN PATENT DOCUMENTS

EP            3989403  A1      4/2022
WO      WO-2021063014  A1  *    4/2021    ........... H02K  1/2766

OTHER PUBLICATIONS

European Patent Application No. 23207003.7 Search Report dated Apr. 15, 2024, 10 pages.
Chinese Patent Application No. 202310431608.9, Office Action dated Aug. 31, 2023, 6 pages.
Chinese Patent Application No. 202310431608.9, English translation of Office Action dated Aug. 31, 2023, 12 pages.
Chinese Patent Application No. 202310431608.9, Office Action dated Nov. 30, 2023, 6 pages.
Chinese Patent Application No. 202310431608.9, English translation of Office Action dated Nov. 30, 2023, 6 pages.

* cited by examiner

ROTOR PUNCHING SHEET, MOTOR ROTOR, MOTOR AND VEHICLE

CROSS-REFERENCE TO RELATED APPLICATIONS

The present application claims the benefit of priority to Chinese Application No. 202310431608.9, filed on Apr. 20, 2023, the content of which is incorporated herein by reference in its entirety for all purposes.

BACKGROUND

As a core part of new energy vehicles, performance of drive motors is very important to the vehicles. In the related art, in order to increase the performance of the motors, this is usually achieved by increasing the speed of the motors and thus increasing the power density of the motors.

SUMMARY

The disclosure relates to the field of motor technology, and particularly to a rotor punching sheet, a motor rotor, a motor and a vehicle.

According to a first aspect of embodiments of the disclosure, a rotor punching sheet includes a sheet body and a plurality of magnet slots defined in the sheet body. Each magnet slot includes a first section and a second section arranged opposite to each other and each configured to extend in a first direction; and a third section and a fourth section arranged opposite to each other and each adjacent to and connected to the first section and the second section, to form the magnet slot together with the first section and the second section. The first section and the third section are connected to each other through a curved section, the curved section is configured to arch towards a side away from a center of the sheet body in a second direction relative to the first section, and the second direction is perpendicular to the first direction.

According to a second aspect of embodiments of the disclosure, a motor rotor includes a plurality of stacked rotor punching sheets. Each rotor punching sheet includes a sheet body and a plurality of magnet slots defined in the sheet body. Each magnet slot includes a first section and a second section arranged opposite to each other and each configured to extend in a first direction; and a third section and a fourth section arranged opposite to each other and each adjacent to and connected to the first section and the second section, to form the magnet slot together with the first section and the second section. The first section and the third section are connected to each other through a curved section, the curved section is configured to arch towards a side away from a center of the sheet body in a second direction relative to the first section, and the second direction is perpendicular to the first direction.

According to a third aspect of embodiments of the disclosure, a motor includes a stator and a rotor. The rotor includes a plurality of stacked rotor punching sheets. Each rotor punching sheet includes a sheet body and a plurality of magnet slots defined in the sheet body. Each magnet slot includes a first section and a second section arranged opposite to each other and each configured to extend in a first direction; and a third section and a fourth section arranged opposite to each other and each adjacent to and connected to the first section and the second section, to form the magnet slot together with the first section and the second section. The first section and the third section are connected to each other through a curved section, the curved section is configured to arch towards a side away from a center of the sheet body in a second direction relative to the first section, and the second direction is perpendicular to the first direction. Magnets are arranged in the magnet slots.

BRIEF DESCRIPTION OF THE DRAWINGS

The accompanying drawings, which are incorporated in and constitute a part of this specification, illustrate embodiments in line with the present disclosure and, together with the description, serve to explain the principle of the present disclosure.

DESCRIPTION OF THE REFERENCE NUMERALS

Figure 1:
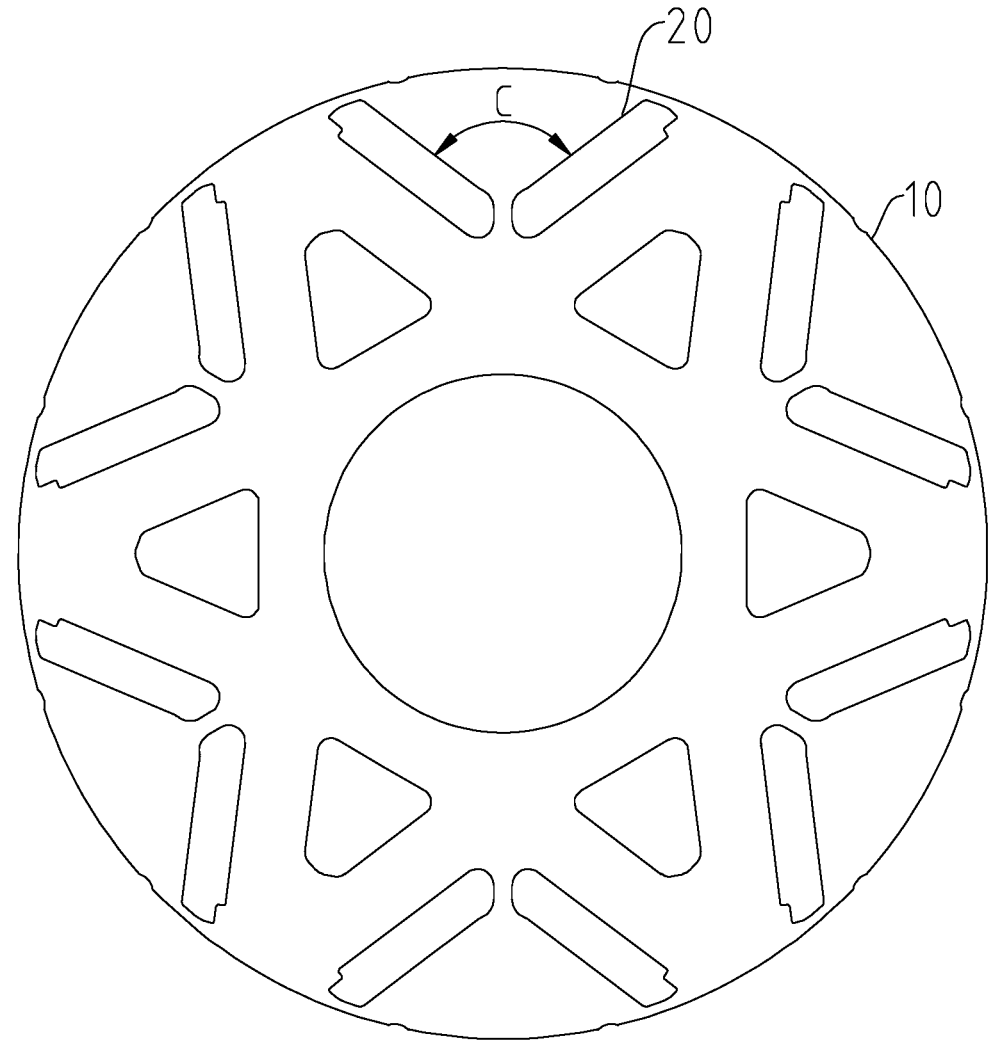
FIG. 1 is a structural schematic diagram illustrating a rotor punching sheet according to an embodiment.

10—sheet body, 11—outer edge, 20—magnet slot, 21—first section, 22—second section, 23—third section, 24—fourth section, 241—first arc section, 242—second arc section, 25—curved section, 251—circular arc section, 252—transition section, 26—shoulder section, 261—support section, 262—connecting section, 201—fillet section, 30—magnet.

DETAILED DESCRIPTION

Embodiments will be described in detail herein, examples of which are illustrated in the accompanying drawings. The following description refers to the accompanying drawings in which the same reference numerals in different drawings represent the same or similar elements unless otherwise represented. The implementations set forth in the following description of the embodiments do not represent all implementations in line with the present disclosure. Instead, they are merely examples of devices and methods in line with aspects related to the present disclosure as recited in the appended claims.

In the disclosure, terms of orientation such as "inner" and "outer" are used to refer to inner and outer of contours of respective components when not stated to the contrary, e.g. an inner side of a sheet body 10 refers to a side near its center and an outer side of the sheet body 10 refers to a side near the outer edge. Terms such as "first, second" and the like are used in the disclosure to distinguish one element from another element and are not sequential or critical.

In related art, increasing the speed of the motors requires higher strength of rotor punching sheets. Current rotor punching sheets of the motors have excessive stress level in some areas under high-speed rotation, so that the speed of the motors may not be further increased.

Figure 5:
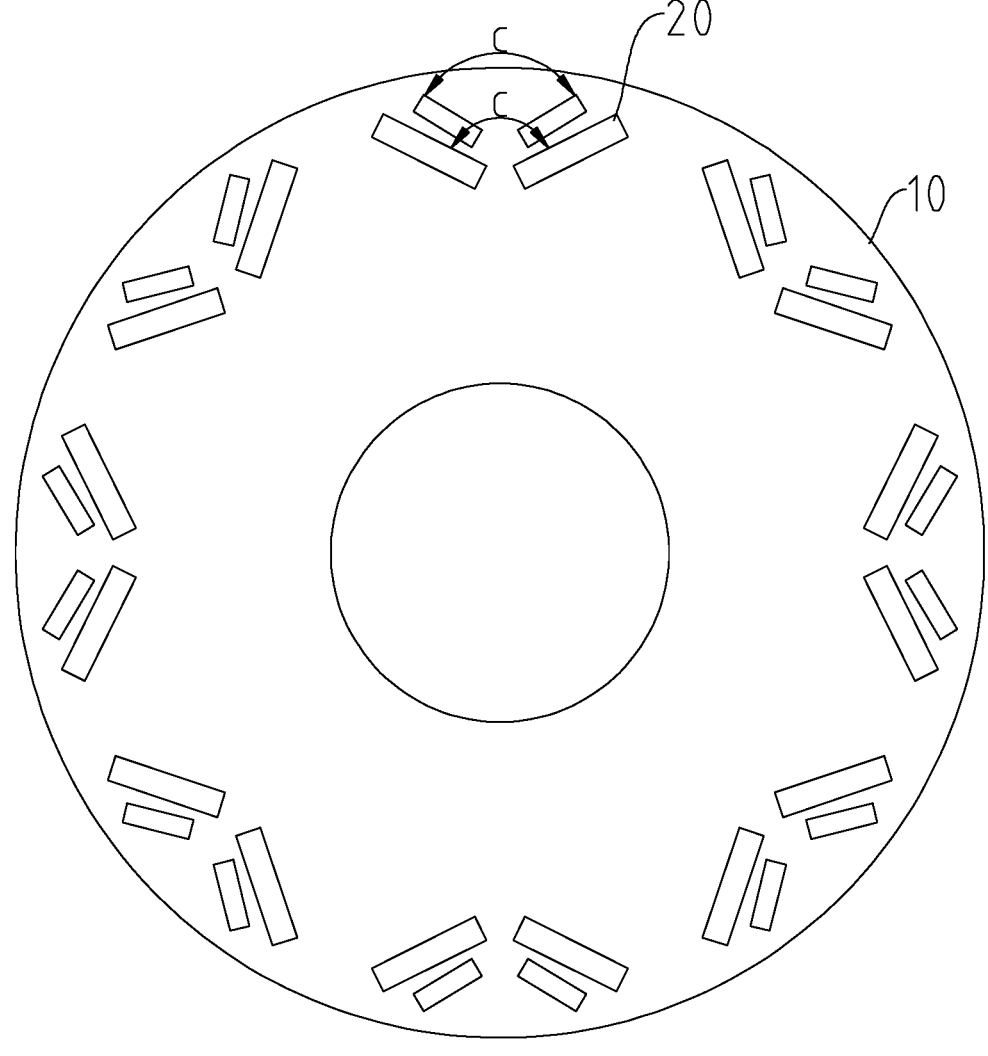
FIG. 5 is a structural schematic diagram illustrating a rotor punching sheet according to another embodiment.

As illustrated in FIG. 1, embodiments of the disclosure provide a rotor punching sheet, including a sheet body 10 and a plurality of groups of magnet slots 20 defined in the sheet body 10. For example, the rotor punching sheet may include six groups as illustrated in FIG. 1, and it may also include five groups, seven groups, or other numbers, which is not limited here. The magnet slots 20 may be used for a single-layer magnet as illustrated in FIG. 1, or may be used for a multi-layer magnet, such as a double-layer magnet as illustrated in FIG. 5.

Figure 2:
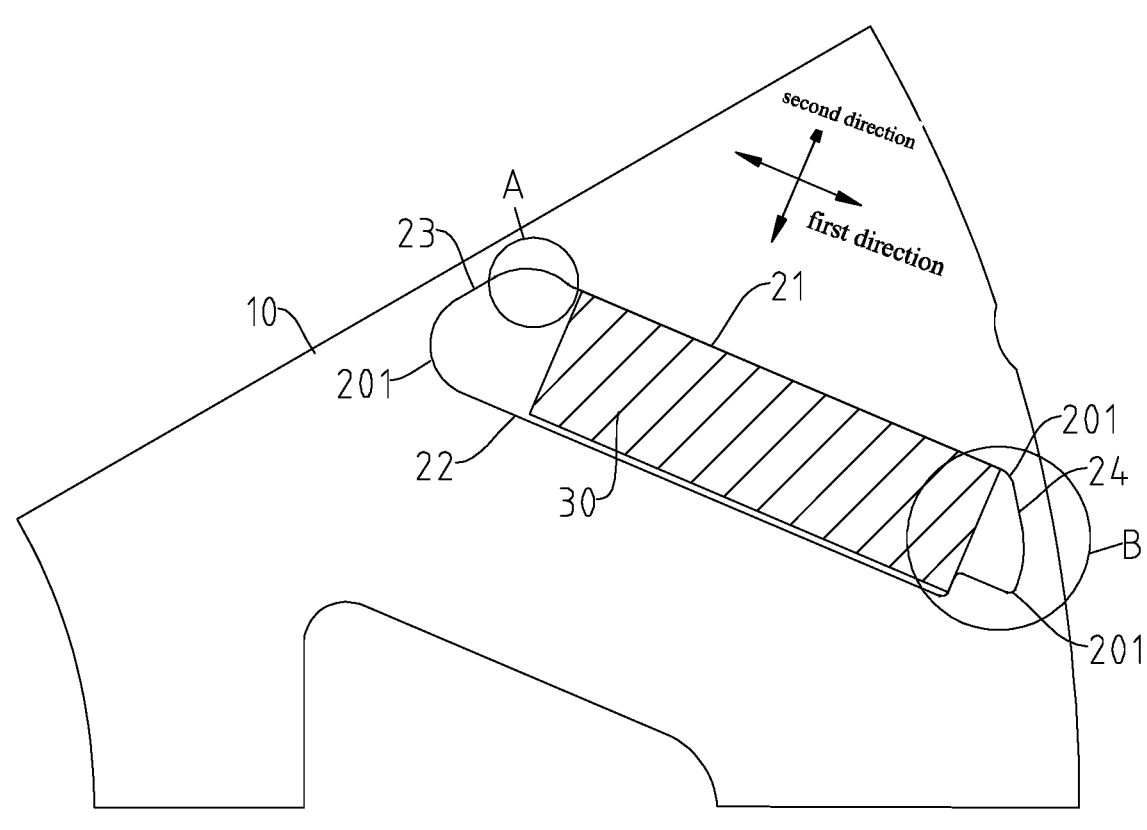
FIG. 2 is a partial structural schematic diagram illustrating a rotor punching sheet provided with a magnet according to an embodiment.

Referring to FIG. 2, the magnet slot 20 may include a first section 21, a second section 22, a third section 23, and a fourth section 24, and the four sections together form the magnet slot. That is, the four sections are arranged around a magnet 30. The first section 21 and the second section 22 are arranged opposite to each other and each configured to extend in a first direction. For example, extending directions of the first section 21 and the second section 22 correspond in shape to an outer contour of the magnet 30, and the magnet 30 may at least fit on the first section 21 after being subjected to a centrifugal force. The third section 23 and the fourth section 24 are arranged opposite to each other and each adjacent to and connected to the first section 21 and the second section 22. For example, the third section 23 is connected to first ends of the first section 21 and the second section 22, and the fourth section 24 is connected to second ends of the first section 21 and the second section 22, to form the magnet slot 20 together with the first section 21 and the second section 22. Connection between the sections herein refers to direct or indirect connection. For example, the indirect connection may be performed through a fillet section 201 or a curved section 25 and the like. The first direction refers to an arrangement direction of the magnet 30 in the rotor punching sheet, namely a length extension direction of the magnet 30. The magnet 30 may not fit on both of the third section 23 and the fourth section 24 and may be spaced from the third section 23 and the fourth section 24, therefore the extension directions of the third section 23 and the fourth section 24 need not to correspond in shape to the outer contour of the magnet 30. For example, an extension direction of at least part of the third section 23 may be substantially a radial extension direction of the sheet body 10, and an extension direction of at least part of the fourth section 24 may be substantially an edge extension direction of the sheet body 10.

Figure 3:
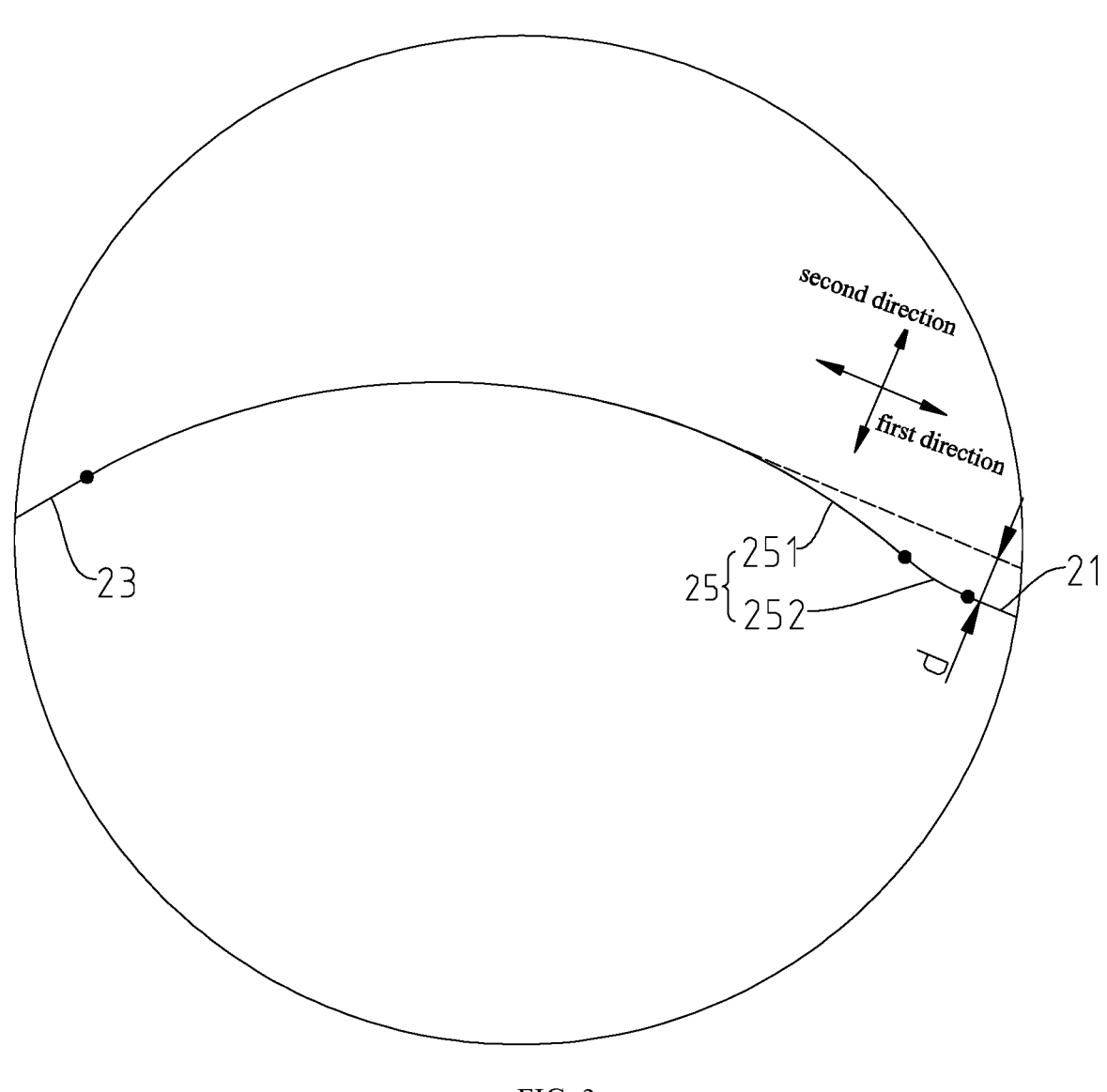
FIG. 3 is an enlarged view of part A of FIG. 2.
Figure 4:
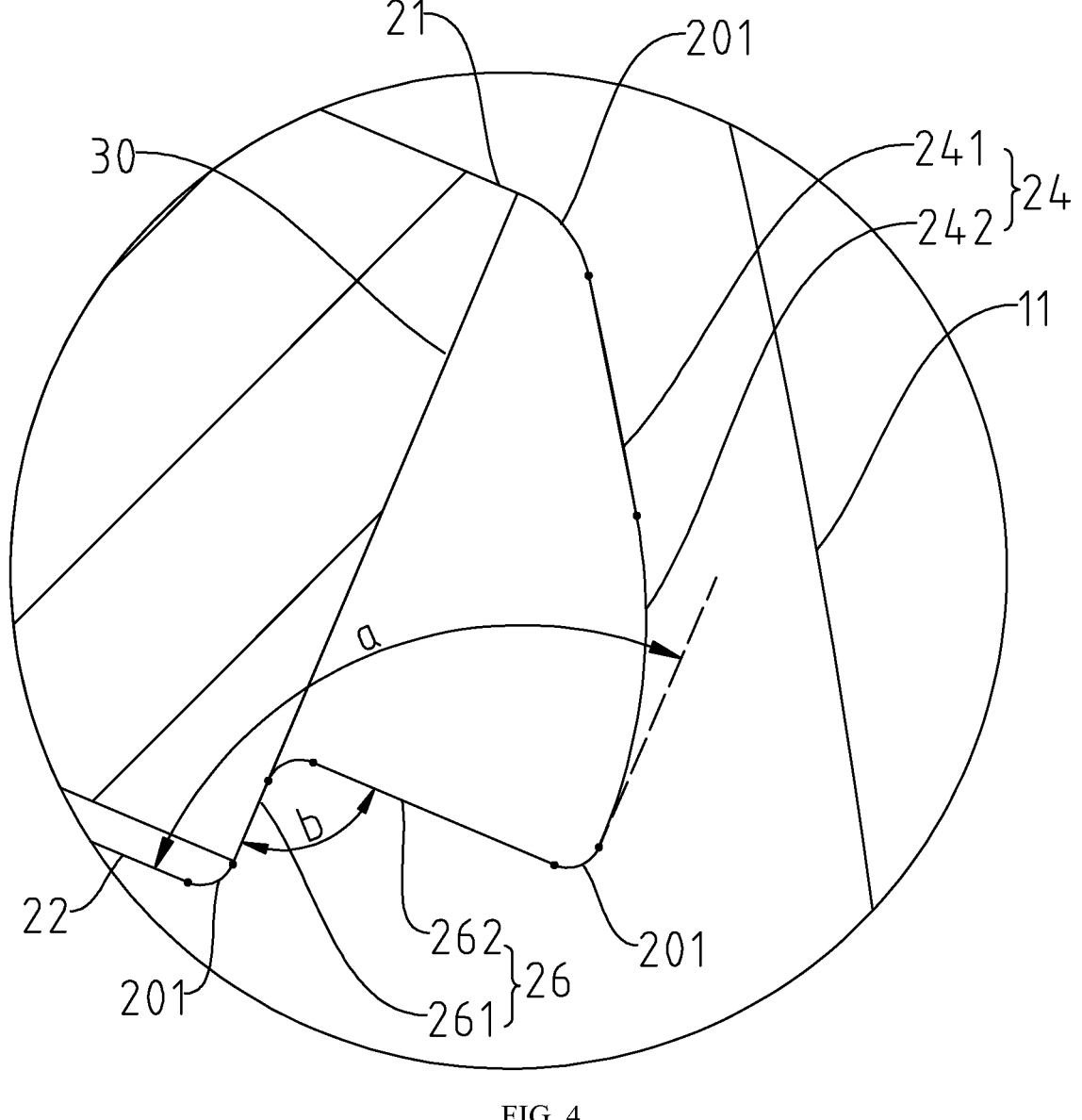
FIG. 4 is an enlarged view of part B of FIG. 2.

Referring to FIG. 3, the first section 21 and the third section 23 are connected to each other through a curved section 25. The curved section 25 is configured to arch towards a side away from a center of the sheet body 10 in a second direction relative to the first section 21. That is, a tangent of the curved section 25 in the first direction is away from the center of the sheet body 10 relative to the first section 21, and the second direction is perpendicular to the first direction. In other words, referring to FIG. 3, a straight line (a dashed line in FIG. 3) extending in the first direction, which is made through a point closest to the second direction on a side of the curved section 25 away from the center of the sheet body 10, is not collinear with the first section 21 in the second direction, and the dashed line is farther from the center of the sheet body 10 than the first section 21. Moreover, it should be noted that, black dots are illustrated in FIGS. 3 and 4 in order to clearly show boundary points between the sections, but it should be clarified that the black dots do not represent actual structural features.

By means of the above-mentioned technical solution, when the rotor punching plate rotates, due to the centrifugal force, a joint between the first section 21 and the third section 23 will be subjected to a large stress under an acting force of the magnet 30. In embodiments of the disclosure, the joint between the first section 21 and the third section 23 is realized by an outwardly arched curved section 25. Compared to a way of directly connecting the two sections or directly connecting the two sections through a fillet, transition stress in a connection area may be effectively reduced, to avoid stress concentration, and a strength of the joint may be improved, which is beneficial to an application of increasing rotate speed of the motor.

In embodiments of the disclosure, the first section 21 is farther from an inner side of the sheet body 10 relative to the second section 22, i.e. the first section 21 is located farther from the center of the sheet body 10. The third section 23 is closer to the inner side of the sheet body 10 relative to the fourth section 24, i.e. the third section 23 is located closer to the center of the sheet body 10 and the fourth section 24 is located closer to the outer edge of the sheet body 10. In this way, the curved section 25 with an arched feature may be arranged between the third section 23 and the first section 21 which is at a greater distance from the center of the sheet body 10 than the second section 22, and a problem of stress concentration at this point under the centrifugal action may be effectively reduced. In other embodiments, it is also possible to arrange the curved section 25 at a joint of the other sections. For example, an arched curved section 25 may be arranged between the second section 22 and the third section 23, and have an arching direction opposite to the arching direction of the aforementioned curved section. In some embodiments, referring to FIG. 3, the connection between the first section 21 and the fourth section 24, between the second section 22 and the third section 23, and between the second section 22 and the fourth section 24, respectively, may be made through the fillet section 201, or may be made through other configured sections (such as a shoulder section 26 described below) in addition to the fillet section 201. The stress concentration caused by sharp corners of the direct connection may be effectively avoided through a form of fillets, reducing the stress concentration at a connection location of the sections.

In embodiments of the disclosure, the curved section 25 may be comprised of one or more curved sections. For example, in one embodiment, referring to FIG. 3, the curved section 25 may include a circular arc section 251 and a transition section 252 connected to each other. A first end of the circular arc section 251 is tangentially connected to the third section 23, i.e. the third section 23 is collinear with a tangent at an end point of the circular arc section 251 connected to the third section 23. The transition section 252 may be transitionally connected between a second end of the circular arc section 251 and the first section 21 to realize a smooth transition between the circular arc section 251 and the first section 21, to avoid a connection sharp corner to disperse the stress, and the structure of this configuration is simple and easy to manufacture. Here, the transition section 252 may be configured as a smooth curve, for example, may be configured as a circular arc, tangentially connected to the first section 21 and the circular arc section 251. The transition section 252 and the circular arc section 251 may be configured as two circular arcs having opposite bending directions and tangentially connected to each other, so that curve transition of the entire curved section 25 is smoother, avoiding the stress concentration as much as possible.

In another embodiment, the curved section 25 may be composed of a segment of circular arc, i.e. the curved section 25 may be directly connected to the first section 21 and the third section 23. In other embodiments, the curved segment 25 may also include one or more connected circular arcs and two transition curves connected at the ends of the one or more connected circular arcs, and the first section 21 and the third section 23 are respectively transitionally connected to the circular arcs through the transition curves.

In embodiments of the disclosure, the side of the curved section 25 located on the same side of the magnet slot 20 as the first section 21 may be arched in the second direction relative to the first section 21 by a distance d of 0.1 mm to 0.3 mm. For example, the distance d may be 0.2 mm, and setting the distance d within this range of values may better reduce the stress concentration to increase strength of the sheet body 10. In other embodiments, the distance d may be adaptively adjusted depending on factors such as arrangement position of the magnet slot 20.

According to an embodiment of the present disclosure, referring to FIG. 4, the fourth section 24 may include a first arc section 241 and a second arc section 242 connected to each other. The first arc section 241 may be configured as a circular arc concentric with and spaced from an outer edge 11 of the sheet body 10, namely, the first arc section 241 is parallel to a corresponding area of the outer edge 11. The second arc section 242 may be configured to gradually curve from the first arc section 241 toward an inner side of the sheet body 10 such that the second arc section 242 is increasingly spaced from the neighboring outer edge 11 of the sheet body 10, i.e. the second arc section 242 gradually extends away from the corresponding area of the outer edge 11 without being parallel to the outer edge 11. In the art, spacing between the fourth section 24 and the outer edge 11 is generally referred to as a magnetic bridge, and due to limitation of a design position of the magnet 30, the magnetic bridge is generally not designed to be excessively large, which results in that the stress in the area will also be greater. Therefore, the spacing between the second arc section 24 and the outer edge 11 may be increased by providing the second arc section 242 which is gradually curved inwardly, effectively alleviating a situation of stress concentration in the area. In embodiments of the disclosure, the fillet section 201 may be connected between the first arc section 241 and the first section 21, and the fillet section 201 may be connected between the second arc section 242 and the second section 22. In other embodiments, the fourth section 24 may also include the first arc section 241 and a straight section connected to the first arc section 241. The straight section may be configured to be inclined toward the inner side of the sheet body 10 to gradually extend away from the outer edge 11 of the sheet body 10, that is to say, the second arc section 242 may also be replaced by the straight section, which is not limited in the disclosure.

Further, the second arc section 242 may be configured as a circular arc to facilitate forming manufacture and smooth transition, and a first end of the second arc section 242 may be connected tangentially to the first arc section 241 to allow gentle connection with the first arc section 241 while avoiding the connection sharp corner. An included angle a between the tangent line (a dashed line in FIG. 4) at the end point of the second end of the second arc section 242 and the second section 22 may be not less than 90 degrees and less than 180 degrees, for example, may be equal to 90 degrees, so that the included angle a is not an acute angle, effectively improving the problem of stress concentration existing here, and reducing a stress level.

In embodiments of the disclosure, referring to FIG. 4, the connection between the second section 22 and the fourth section 24 may be made through the shoulder section 26 in addition to the above-described fillet section 201, e.g. the connection between the second section 22 and the fourth section 24 is made through the shoulder section 26 and the fillet sections 201 connected at both ends of the shoulder section 26. The shoulder section 26 may include a support section 261 and a connecting section 262 connected to each other. The support section 261 is configured to support the magnet 30 and limit the magnet 30 in a centrifugal direction generated during rotation of the rotor punching sheet, the support section 261 is connected to the second section 22 through the fillet section 201, the connecting section 262 is connected to the fourth section 24 through the fillet section 201, and an included angle b between the support section 261 and the connecting section 262 is not less than 90 degrees and less than 180 degrees, for example, 90 degrees or 100 degrees, etc. Under the high-speed rotation of the rotor punching sheet, the magnet 30 exerts a large force on the shoulder section 26, resulting in a large stress at this position, which is difficult to meet strength requirements at higher rotate speed. Therefore, in embodiments of the disclosure, by setting the included angle b of the shoulder section 26 to be not less than 90 degrees and less than 180 degrees, that is, not the acute angle, the stress level of the shoulder section 26 may be effectively reduced, allowing the rotor punching sheet to achieve higher rotate speed.

In one embodiment, referring to FIG. 1, each group of magnet slots 20 may include two magnet slots 20, and the two magnet slots 20 may be arranged in a V-shape with an opening facing an outer side of the sheet body 10, and the V-shape is symmetrical relative to a radial direction of the sheet body 10. Spacing is formed between the third sections of the two magnet slots 20 to constitute the magnetic bridge. In some embodiments, each group of magnet slots 20 may also include four magnet slots 20 as illustrated in FIG. 5, with every two magnet slots arranged in the V-shape.

The V-shape has an included angle c of 90 degrees to 120 degrees, for example 100 degrees. Improvement of the sections of the magnet slots 20 as described above is applied to the magnet slots 20 arranged in such a manner that the problem of stress concentration may be solved better, effectively increasing the strength of the rotor punching sheet, and solving the problem that the rotate speed of the motor is difficult to increase. The magnet slots 20 of embodiments of the disclosure may employ other arrangements, which is not limited herein.

According to a second aspect of embodiments of the disclosure, there is provided a motor rotor that may include a plurality of stacked rotor punching sheets, which may be the rotor punching sheets described above. The motor rotor may have all the beneficial effects of the rotor punching sheet described above, which will not be repeated here.

According to a third aspect of embodiments of the disclosure, there is provided a motor. The motor includes a stator and the above-mentioned rotor, and the magnets 30 are arranged in the magnet slots 20 of the rotor punching sheet of the rotor. The motor may achieve a high rotate speed, having a high power density. The motor has all the beneficial effects of the above-mentioned rotor, which will not be repeated here.

According to a fourth aspect of embodiments of the disclosure, there is provided a vehicle, which includes the above-mentioned motor and has all the beneficial effects of the above-mentioned motor, which will not be repeated here.

According to a first aspect of embodiments of the disclosure, there is provided a rotor punching sheet, including a sheet body and a plurality of groups of magnet slots defined in the sheet body. The magnet slot includes a first section and a second section arranged opposite to each other and each configured to extend in a first direction; and a third section and a fourth section arranged opposite to each other and each adjacent to and connected to the first section and the second section, to form the magnet slot together with the first section and the second section. The first section and the third section are connected to each other through a curved section, the curved section is configured to arch towards a side away from a center of the sheet body in a second direction relative to the first section, and the second direction is perpendicular to the first direction.

In some examples, the curved section is composed of a segment of circular arc, or the curved section includes a circular arc section and a transition section connected to each other, a first end of the circular arc section is tangentially connected to the third section, and the transition section is transitionally connected between the second end of the circular arc section and the first section.

In some examples, the curved section includes a circular arc section and a transition section tangentially connected to each other and each configured as a circular arc, a first end of the circular arc section is tangentially connected to the third section, the transition section is transitionally connected between the second end of the circular arc section and the first section, and the transition section and the circular arc section are configured to have opposite circular arc bending directions.

In some examples, a portion of the curved section located on a same side of the magnet slot as the first section is arched in the second direction relative to the first section by a distance d of 0.1 mm to 0.3 mm.

In some examples, the fourth section includes a first arc section and a second arc section connected to each other, the first arc section is configured as a circular arc concentric with and spaced from an outer edge of the sheet body, and the second arc section is configured to gradually curve from the first arc section toward an inner side of the sheet body such that the second arc section is increasingly spaced from the neighboring outer edge of the sheet body.

In some examples, the second arc section is configured as a circular arc, and a first end of the second arc section is tangentially connected to the first arc section, and an included angle between a tangent line at an end point of the second end of the second arc section and the second section is not less than 90 degrees and less than 180 degrees.

In some examples, the second section and the fourth section are connected through a shoulder section, the shoulder section includes a support section and a connecting section connected to each other, the support section is configured to support a magnet in a centrifugal direction generated during rotation of the rotor punching sheet, the support section is connected to the second section, the connecting section is connected to the fourth section, and an included angle between the support section and the connecting section is not less than 90 degrees and less than 180 degrees.

In some examples, each group of magnet slots includes two magnet slots arranged in a V-shape with an opening facing an outer side of the sheet body, the V-shape is symmetrical relative to a radial direction of the sheet body, and spacing is defined between third sections of the two magnet slots.

In some examples, the V-shape has an included angle of 90 degrees to 120 degrees.

In some examples, the first section is farther from an inner side of the sheet body relative to the second section, the third section is closer to the inner side of the sheet body relative to the fourth section, and the fourth section is arranged close to an outer edge of the sheet body.

According to a second aspect of embodiments of the disclosure, there is provided a motor rotor, including a plurality of stacked rotor punching sheets, which are rotor punching sheets provided by the disclosure.

According to a third aspect of embodiments of the disclosure, there is provided a motor, including a stator and a rotor provided by the disclosure, and magnets are arranged in the magnet slots.

According to a fourth aspect of embodiments of the disclosure, there is provided a vehicle, including a motor provided by the disclosure.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including common knowledge or conventional technical means known in the art but not disclosed in the present disclosure. The specification and examples should be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. The scope of the present disclosure is only limited by the appended claims.

What is claimed is:

1. A rotor punching sheet, comprising:
   a sheet body; and
   a plurality of magnet slots defined in the sheet body, each magnet slot comprising:
       a first section and a second section arranged opposite to each other and each configured to extend in a first direction; and
       a third section and a fourth section arranged opposite to each other and each adjacent to and connected to the first section and the second section, to form the magnet slot together with the first section and the second section,
   wherein the first section and the third section are connected to each other through a curved section, the curved section is configured to arch towards a side away from a center of the sheet body in a second direction relative to the first section, and the second direction is perpendicular to the first direction,
   wherein a portion of the curved section located on a same side of the magnet slot as the first section is arched in the second direction relative to the first section by a distance of 0.1 mm to 0.3 mm, and
   wherein the second section and the fourth section are connected through a shoulder section, the shoulder section comprises a support section and a connecting section connected to each other, the support section is configured to support a magnet in a centrifugal direction generated during rotation of the rotor punching sheet, the support section is connected to the second section, the connecting section is connected to the fourth section, and an included angle between the support section and the connecting section facing away from the magnet slot is not less than 90 degrees and less than 180 degrees.

2. The rotor punching sheet of claim 1, wherein the curved section is composed of a segment of circular arc.

3. The rotor punching sheet of claim 1, wherein the curved section comprises a circular arc section and a transition section connected to each other, a first end of the circular arc section is tangentially connected to the third section, and the transition section is transitionally connected between a second end of the circular arc section and the first section.

4. The rotor punching sheet of claim 1, wherein the curved section comprises a circular arc section and a transition section tangentially connected to each other and each configured as a circular arc, a first end of the circular arc section is tangentially connected to the third section, the transition section is transitionally connected between a second end of the circular arc section and the first section, and the transition section and the circular arc section are configured to have opposite circular arc bending directions.

5. The rotor punching sheet of claim 1, wherein the fourth section comprises a first arc section and a second arc section connected to each other, the first arc section is configured as a circular arc concentric with and spaced from an outer edge of the sheet body, and the second arc section is configured to gradually curve from the first arc section toward an inner side of the sheet body such that the second arc section is increasingly spaced from a neighboring outer edge of the sheet body.

6. The rotor punching sheet of claim 5, wherein the second arc section is configured as a circular arc, and a first end of the second arc section is tangentially connected to the first arc section, and an included angle between a tangent line at an end point of the second end of the second arc section and the second section is not less than 90 degrees and less than 180 degrees.

7. The rotor punching sheet of claim 5, wherein a fillet section is connected between the first arc section and the first section, and another fillet section is connected between the second arc section and the second section.

8. The rotor punching sheet of claim 1, wherein the included angle between the support section and the connecting section is 90 degrees or 100 degrees.

9. The rotor punching sheet of claim 1, the plurality of magnet slots forming a plurality of groups of magnet slots, wherein each group of magnet slots comprises two magnet slots of the plurality of magnet slots arranged in a V-shape with an opening facing an outer side of the sheet body, the V-shape is symmetrical relative to a radial direction of the sheet body, and spacing is defined between the third sections of the two magnet slots.

10. The rotor punching sheet of claim 9, wherein the V-shape has an included angle of 90 degrees to 120 degrees.

11. The rotor punching sheet of claim 10, wherein the V-shape has an included angle of 100 degrees.

12. The rotor punching sheet of claim 1, wherein the first section is farther from an inner side of the sheet body relative to the second section, the third section is closer to the inner side of the sheet body relative to the fourth section, and the fourth section is arranged close to an outer edge of the sheet body.

13. The rotor punching sheet of claim 1, wherein extending directions of the first section and the second section correspond in shape to an outer contour of a magnet, and the magnet is configured to at least fit on the first section after being subjected to a centrifugal force.

14. The rotor punching sheet of claim 13, wherein the third section and the fourth section are spaced from the magnet.

15. The rotor punching sheet of claim 1, wherein an extension direction of at least part of the third section is a radial extension direction of the sheet body, and an extension direction of at least part of the fourth section is an edge extension direction of the sheet body.

* * * * *